United States Patent
Hennecke

(10) Patent No.: US 7,552,221 B2
(45) Date of Patent: Jun. 23, 2009

(54) SYSTEM FOR COMMUNICATING WITH A SERVER THROUGH A MOBILE COMMUNICATION DEVICE

(75) Inventor: Marcus Hennecke, Ehrensteiner Feld (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 10/966,788

(22) Filed: Oct. 15, 2004

(65) Prior Publication Data

US 2005/0144255 A1 Jun. 30, 2005

(30) Foreign Application Priority Data

Oct. 15, 2003 (EP) .................................. 03023515
Oct. 15, 2003 (EP) .................................. 03023516

(51) Int. Cl.
*G06F 15/16* (2006.01)

(52) U.S. Cl. .................... 709/228; 709/203; 709/219; 715/747; 704/2; 704/277; 379/88.06; 455/556.2

(58) Field of Classification Search .............. 709/203, 709/217, 219, 228; 455/556.2; 715/747; 704/2, 7, 277; 379/88.05–88.06

See application file for complete search history.

(56) References Cited

U.S. PATENT DOCUMENTS

| | | | |
|---|---|---|---|
| 4,827,520 A | 5/1989 | Zeinstra | |
| 6,012,030 A | 1/2000 | French-St. George et al. | |
| 6,041,300 A | 3/2000 | Ittycheriah et al. | |
| 6,073,013 A | 6/2000 | Agre et al. | |
| 6,073,101 A | 6/2000 | Maes | |
| 6,088,671 A | 7/2000 | Gould et al. | |
| 6,138,098 A | 10/2000 | Shieber et al. | |
| 6,169,789 B1 * | 1/2001 | Rao et al. ............ 379/110.01 | |
| 6,173,266 B1 | 1/2001 | Marx et al. | |
| 6,208,932 B1 | 3/2001 | Ohmura et al. | |
| 6,236,968 B1 | 5/2001 | Kanevsky et al. | |
| 6,246,981 B1 | 6/2001 | Papineni et al. | |
| 6,345,254 B1 | 2/2002 | Lewis et al. | |
| 6,393,403 B1 | 5/2002 | Majaniemi | |
| 6,396,481 B1 | 5/2002 | Challa et al. | |
| 6,411,934 B1 | 6/2002 | Moller et al. | |
| 6,422,522 B1 | 7/2002 | Woollen | |

(Continued)

FOREIGN PATENT DOCUMENTS

EP 0 911 808 A1 4/1999

(Continued)

OTHER PUBLICATIONS

H. Maes, Stephane et al. Editors, W3C "Multimodal Interaction Requirements", XP-002271304, obtained from the internet at, http://www.w3.org/TR/2003/NOTE-mmi-reqs-20030108 on Feb. 24, 2004, pp. 1-37.

(Continued)

*Primary Examiner*—David Lazaro
(74) *Attorney, Agent, or Firm*—Brinks Hofer Gilson Lione

(57) ABSTRACT

Disclosed are systems and methods for providing information from a server via a mobile communication device. One implementation of a method includes the acts of automatically determining a preferred language of the mobile communication device by the server, and providing information in a preferred language for the mobile communication device by the server.

21 Claims, 4 Drawing Sheets

U.S. PATENT DOCUMENTS

| | | |
|---|---|---|
| 6,453,020 B1 | 9/2002 | Hughes et al. |
| 6,496,799 B1 | 12/2002 | Pickering |
| 6,499,015 B2 | 12/2002 | Brooks et al. |
| 6,505,155 B1 | 1/2003 | Vanbuskirk et al. |
| 6,594,630 B1 | 7/2003 | Zlokarnik et al. |
| 6,598,020 B1 | 7/2003 | Kleindienst et al. |
| 6,601,029 B1 | 7/2003 | Pickering |
| 6,654,720 B1 | 11/2003 | Graham et al. |
| 6,658,388 B1 | 12/2003 | Kleindienst et al. |
| 6,704,396 B2* | 3/2004 | Parolkar et al. .......... 379/88.17 |
| 6,721,633 B2 | 4/2004 | Funk et al. |
| 6,741,963 B1 | 5/2004 | Badt et al. |
| 6,748,361 B1 | 6/2004 | Comerford et al. |
| 6,785,651 B1 | 8/2004 | Wang |
| 6,801,897 B2 | 10/2004 | Kist et al. |
| 6,832,196 B2 | 12/2004 | Reich |
| 6,839,670 B1 | 1/2005 | Stammler et al. |
| 6,895,242 B2 | 5/2005 | Fu et al. |
| 6,907,119 B2* | 6/2005 | Case et al. ............. 379/218.01 |
| 6,922,200 B1 | 7/2005 | Marques |
| 6,931,446 B1* | 8/2005 | Cox et al. ................... 709/227 |
| 6,950,793 B2 | 9/2005 | Ross et al. |
| 6,985,850 B1* | 1/2006 | Scanlan ......................... 704/2 |
| 6,996,426 B2 | 2/2006 | Granberg |
| 7,085,723 B2 | 8/2006 | Ross et al. |
| 7,099,829 B2 | 8/2006 | Gomez |
| 7,127,402 B2 | 10/2006 | Ross et al. |
| 7,146,323 B2 | 12/2006 | Guenther et al. |
| 7,165,027 B2 | 1/2007 | Kellner et al. |
| 7,171,365 B2 | 1/2007 | Cooper et al. |
| 7,174,298 B2 | 2/2007 | Sharma |
| 7,234,110 B2* | 6/2007 | Sumitomo .................. 715/513 |
| 7,254,539 B2 | 8/2007 | Carberry et al. |
| 7,257,537 B2 | 8/2007 | Ross et al. |
| 7,340,389 B2* | 3/2008 | Vargas ........................... 704/8 |
| 2002/0007418 A1 | 1/2002 | Hegde et al. |
| 2002/0067839 A1 | 6/2002 | Heinrich |
| 2002/0198699 A1* | 12/2002 | Greene et al. ................... 704/2 |
| 2003/0004725 A1 | 1/2003 | Agapi et al. |
| 2003/0005159 A1* | 1/2003 | Kumhyr ..................... 709/246 |
| 2003/0040899 A1* | 2/2003 | Ogilvie .......................... 704/2 |
| 2003/0191646 A1 | 10/2003 | D'Avello et al. |
| 2003/0191817 A1* | 10/2003 | Fidler ......................... 709/219 |
| 2004/0078762 A1* | 4/2004 | Lee et al. .................... 709/219 |
| 2004/0167770 A1 | 8/2004 | Zhuo et al. |
| 2004/0192384 A1* | 9/2004 | Anastasakos et al. ........ 455/557 |
| 2004/0194099 A1* | 9/2004 | Lamping et al. ............. 718/100 |
| 2004/0198326 A1* | 10/2004 | Hirani ..................... 455/414.1 |
| 2004/0243419 A1 | 12/2004 | Wang |
| 2004/0249638 A1 | 12/2004 | Wang |
| 2004/0264672 A1 | 12/2004 | Paek et al. |
| 2006/0079332 A1 | 4/2006 | Bishop |

FOREIGN PATENT DOCUMENTS

| | | |
|---|---|---|
| EP | 1 054 390 A2 | 5/2000 |
| EP | 1 063 636 A2 | 12/2000 |
| EP | 1 231 798 A2 | 8/2002 |
| EP | 1 524 778 A1 | 4/2005 |
| FR | 2 808 915 A1 | 11/2001 |
| GB | 2 343 779 A | 5/2000 |
| GB | 2 372 864 A | 9/2002 |
| WO | WO 99-57648 A1 | 11/1999 |
| WO | WO 00/52921 | 2/2000 |
| WO | WO 01/41490 A1 | 6/2001 |
| WO | WO 02-05264 A1 | 1/2002 |
| WO | WO 02/087098 A1 | 10/2002 |

OTHER PUBLICATIONS

Hickey, Marianne, Editor, W3C "Multimodal Requirements for Voice Markup Languages", XP-002271602, obtained from the internet at, http://www.w3.org/TR/2000/WD-multimodal-reqs-20000710 on Feb. 26, 2004, pp. 1-17.

Kuhn et al., "Learning Speech Semantics with Keyword Classification Trees," CRIM, School of Computer Science, McGill University, Montreal, Quebec, Canada H3A 2A7, Apr. 1993, pp. 1155-1158.

McGlashan, Scott et al., Editors, W3C "Voice Extensible Markup Language (VoiceXML) Version 2.0.", XP-002248286, obtained from the internet at, http://www.w3.org/TR/voicexml on Jul. 18, 2003, 1-80.

McGlashan, Scott et al., Editors, W3C "Voice Extensible Markup Language (VoiceXML) Version 2.0", XP-002248286, obtained from the internet at, http://www.w3.org/TR/voicexml on Jul. 18, 2003, 81-161.

Rudnicky et al., "Spoken Language Recognition in an Office Management Domain," ICASSP 91, vol. 2, 1991 International Conference on Acoustics, Speech, and Signal Processing, May 14-17, 1991, pp. 829-832.

S P A Ringland et al. "Multimodality—the future of the wireless user interface", XP-001171240, BT Technology Journal, vol. 21, No. 3, Jul. 2003, pp. 181-191.

* cited by examiner

SYSTEM FOR COMMUNICATING WITH A SERVER THROUGH A MOBILE COMMUNICATION DEVICE

PRIORITY CLAIM

This application claims priority to European Application No. 03023516.2 filed on Oct. 15, 2003, and European Application No. 03023515.4 filed on Oct. 15, 2003. The disclosure of the above application is incorporated herein by reference.

BACKGROUND OF THE INVENTION

1. Technical Field.

This invention relates to mobile data interfaces. More particularly, this invention relates to techniques for selecting and using a language for an information interface.

2. Related Art.

Mobile communication devices, such as mobile phones, personal digital assistants (PDAs) with a telephone module, mobile digital assistants (MDAs) or automotive head units with a telephone module may be used for acquiring information in different ways. A typical use for such devices would be to call a travel agency and to ask a corresponding travel agent for flight information. Another example would be the use of calling directory assistance.

Increasingly, part or all of the requested information services are provided by automated systems. In such cases, a customer calls a person and, at a certain stage of the dialog may be connected to a computer that provides the requested information. In some cases, the user may directly call a server or a computer that itself may be configured to enter into a dialog with the customer. During the dialog, the customer may be prompted to enter a question or to tell the system what information is to be provided.

However, in the case where the user is traveling internationally, the user may know none or very little of the language of the country in which he is traveling. In this case, the user may make a call to an information service with the hope that his language capabilities are sufficient to make him understood and to understand the information provided by the information service. The user may otherwise have to seek a human operator who speaks a language familiar to the user. Thus, there is a need for communicating information from a server via a mobile communication device that enables the acquisition of information in an automated multilingual way.

SUMMARY

This application relates to a system for communicating information from a server via a mobile communication device. In particular, this application relates to a system for providing information communicated from a server to a mobile communication device in a multilingual environment. The system further provides a method for providing information communicated from a server to a mobile communication device in a multilingual environment including (a) automatically determining a preferred language of the mobile communication device by the server, and (b) providing information in a preferred language for the mobile communication device by the server.

A method for receiving information by a mobile communication device from a server is provided. The method may include acts to automatically transmit preferred language information from the mobile communication device to the server, and may enable a user to acquire information from a server via a mobile communication device in a specific language. Preferred language information may be transmitted automatically from the mobile communication device to the server so that the server knows about the preferred language and may provide the required information accordingly. Automatic transmissions may be performed upon request of the server. Such a request may include, for example, a signal prompting the mobile communication device to transmit corresponding preferred language information.

Methods for receiving information may also include transmitting the language settings of a mobile communication device and/or of a speech recognition means of the mobile communication device. These language settings may indicate languages with which the user is familiar. The methods may also include steps of receiving a dialog script for performing a dialog between the mobile communication device and a user from the server, and running the dialog script on the mobile communication device. A server may also initiate a dialog script for performing a dialog between the server and a user.

Methods for receiving information may also include activating a translation means of a mobile communication device for a preferred language. Particularly, if no dialog script for a preferred language is available, a multilingual environment may be provided by the use of a translation means. In particular, a prompt or an information output may be translated into a preferred language with which a user is familiar.

A method for communicating information from a server via a mobile communication device is also provided where a data connection between the server and the mobile communication device is established. Information may then be provided from a server. The method may further include the act of receiving information by a mobile communication device.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
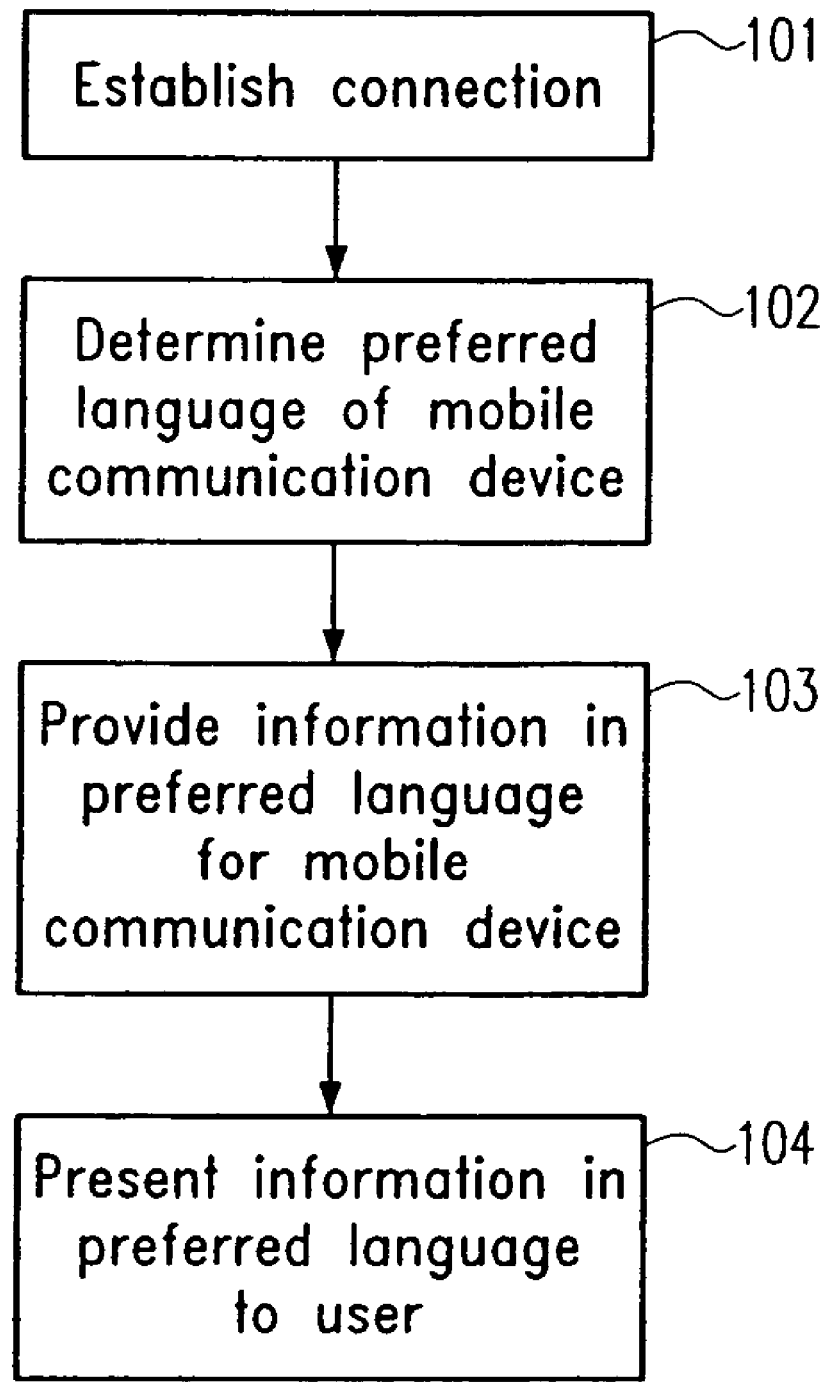
FIG. 1 is a flow diagram illustrating a method for communicating information from a server via a mobile communication device.

FIG. 1 illustrates a course of action for communicating information from a server to a user via a mobile communication device. A connection may be established between a server and a mobile communication device via a network 101. This connection may be achieved, for example, by manually dialing a corresponding phone number, or may be initiated automatically upon occurrence of a specific event.

Mobile communication devices are portable devices that allow for a wireless transmission of signals. Typical mobile communication devices are mobile phones, PDA's, MDA's, smart phones or automotive head units. A mobile communication device may include a means for establishing a wireless data connection to a server via a telephone or another network, such as a digital network. An example for such a means would be a GSM module, a CDMA module, a TDMA module, or communications modules for networks with other communications protocols. The server may be any device for providing information such as a computer of a travel agency, directory assistance, a service for booking a hotel, or the like. Because of the mobile communication device, the connection may be established in a wireless way, for example, via a common digital mobile phone network or another network.

After the connection has been established, a preferred language of the mobile communication device may be determined 102. A preferred language of a mobile communication device may be a human language that is used for configuring the mobile communication device or some parts or modules thereof. In particular, a preferred language may be the language to which a user has set the mobile communication device for operation, such as the language in which the mobile communication device communicates with or prompts the user. In principle, a mobile communication device need not have only one preferred language. For example, several different languages may be configured, or different modules or capabilities of a mobile communication device may be configured with different languages.

The preferred language of the mobile communication device may be determined automatically, and the mobile communication device may be provided with information in the preferred language. Thus, a user may not need to enter a dialog with an information service in a language with which he is not familiar. Rather, the user may obtain the information automatically in a preferred language of the mobile communication device.

Further, a server may determine the preferred language by requesting preferred language information from the mobile communication device. The preferred language information may be data that indicates the preferred language or languages of the mobile communication device. Thus, the server may take the initiative and ask the mobile communication device for the preferred language(s). If the mobile communication device does not automatically provide the language information, the server may obtain this information by initiating such a request, for example, in the situation when a contacted server does not have the capability to automatically determine a preferred language. In such a case, it is not necessary for the mobile communication device to transmit corresponding data to the server and provide language information.

The request made by a server may query the language settings of the mobile communication device and/or of a speech recognition means of the mobile communication device. In this way, the relevant language information may be obtained, since the language settings of the mobile communication device itself or a speech recognition means of the mobile communication device most likely correspond to a language the user of the mobile communication device is familiar with.

Procedures for determining a preferred language may include determining at least two preferred languages and ranking the preferred languages according to a predetermined criterion. In this way, if the mobile communication device is configured with more than one language, and, thus, has more than one preferred language, selection may be made between these different languages. In order to select one preferred language, it may be necessary to make a ranking yielding a "most preferred" language the server may use for further processing.

Each preferred language of the mobile communication device may have a previously assigned priority and the preferred languages may be ranked based on that priority. A user of the mobile communication device may select these priorities. Thus, the ranking and selection of a preferred language may correspond to the preferences of a user. Alternatively, the settings of a mobile communication device may be such that the language for the operation of the mobile communication device may be automatically assigned a higher priority than a different language of a speech recognition means present in the mobile communication device, or vice versa. In such a case, the different languages may have a predetermined priority.

In some implementations, a mobile communication device and/or a server may be equipped with translation means for more than one language. Each translation means may have an assigned performance value, and the preferred languages may be ranked according to the performance value. Such a ranking may be useful if the desired information is provided via a translation means for the preferred language.

A system may be equipped with more than one translation means. The system may have translation means for a translation into more than one language. The translation means may be distinguished. This may be achieved by assigning a performance value to each of the translation means. The performance value may be based on the quality of the translation. For example, a performance value may be obtained by translating a test sentence into different languages by the corresponding translation means and counting the translation errors. Alternatively, the performance value may be based on the size of the vocabulary set a translation means is using.

The preferred languages may be ranked based on the priority and the performance value. In this way, the criterion is based on both parameters. For this, the priority and the performance value may be given different weights and be summed or otherwise combined so as to obtain a combined value for the ranking.

Once the server is contacted and the preferred language identified, the server may provide information in the preferred language for the mobile communication device 103. There are a number of ways to provide the information. In the simplest case, for example, the information may be some data (e.g., the current time if a speaking clock has been called) that may be provided without further information required from the user. In this case, the information may be transmitted directly to the mobile communication device. In more complex cases, however, it might be necessary to enter a dialog with a user.

A server may provide a dialog script for the mobile communication device to execute a dialog between the mobile communication device and a user. The dialog script may be run on the mobile communication device. A dialog script may include instructions for the mobile communication device for causing the mobile communication device to perform a dialog between the device and the user. In particular, the dialog script may include instructions for the mobile communication device on how to prompt a user and how to react on a user's input. The language of a dialog script may be the language in which a user is prompted when running the dialog script.

Thus, a user may acquire information by way of a dialog. The dialog may be simplified and adapted to run on the mobile communication device. For example, a data connection between the mobile communication device and the server may be required for transmitting the dialog script from the server to the mobile communication device only at initiation, when a user is contacting an information server for acquiring information. After that, during the dialog, a connection may be necessary only under special circumstances, examples of which are described later. Thus arrangement may reduce the time a connection between a server and a mobile communication device has to be maintained. Since the dialog script may be run on a mobile communication device, the load of the server may be relieved, particularly if many users are requesting information from the same server.

Furthermore, if, for example, a speech input is enabled, the speech signal may be processed directly on the mobile communication device with a higher bandwidth, thereby avoiding distortions of the signal due to the transmission to the server (for example, via a GSM channel). Providing a dialog script may include selecting a dialog script for the preferred language by the server. If a dialog script for the preferred language is already available on the server, acquiring and providing information from a server may be enabled in a very simple and effective way, since no translation is necessary during the dialog.

The information may be presented in the preferred language to the user 104. The information may be presented a number of ways, in particular, using the capabilities of the mobile communication device. Thus, the information may be presented acoustically and/or optically where in the latter case, the information may even be presented on a touch screen display.

Information may be provided in the preferred language by activating a translation means of the server and/or the mobile communication device for the preferred language. The translation means may be useful if the information is only available in a language that is not a preferred language. In this case, if a corresponding translation means is present with the server and/or the mobile communication device, the information may be translated automatically into a language with which the user is familiar. A translation means may be used if no dialog script for the preferred language is selected. In other words, the processing time consuming translation may be necessary only if no dialog script for the corresponding language is available.

To provide information in a preferred language, a system may acoustically and/or optically prompt a user and/or present information to the user. Such prompting may exploit different capabilities of a mobile communication device. In particular, presenting a prompt or information on a display may be useful if this output is rather complex or complicated. Optical prompting may be performed, for example, on a touch screen, where a part of the presented information or of the prompt is selectable via the touch screen. A touch screen may be a display device that also serves as an input. An input may be made using a finger or a corresponding pen, for example. Optical prompting may offer a highly simplified dialog for the user who may react on an output by directly manipulating or selecting a part of this output.

Alternative or supplemental interfaces may include an acoustic and/or haptic and/or graphic input. Such inputs may allow a user to make an input in the respective most suitable way. A haptic input includes an input via keys or via selecting on a touch screen. For example, information representing different alternatives to be selected by the user may be displayed on a touch screen such that the user may select one of the alternatives directly via the touch screen. A graphical input may be a touch screen input where the user provides the input in a graphical way, for example, by writing the input on the touch screen by hand using a corresponding pen, such as a stylus.

Acquiring an acoustic input may include processing the acoustic input using speaker independent and/or speaker dependent speech recognition. Acquiring a graphical input may include processing the input using character recognition.

To provide communication in a preferred language, a system may select and contact a human operator for the preferred language. The server may determine a preferred language and automatically select a corresponding human operator. In this way, a user may also be connected to an operator speaking the language familiar to the user. The operator may then search for the required information, for example, and provide the information to the user by transmitting it from the server to the mobile communication device.

A dialog script may be run on the server for performing a dialog between the server and a user. Thus, a user may acquire information via a dialog with the server. This dialog script on the server may supplement a dialog between the mobile communication device and the user. This may be particularly useful if at one stage during the dialog between the mobile communication device and the user, the capabilities of the mobile communication device are not sufficient for further continuation. The server may then take over for this part of the dialog.

In some cases, the mobile communication device may need additional data to continue the dialog. For example, if the user is requesting timetable information, the memory of the mobile communication device might be too small to store all possible destinations, or the required time for transmitting all the destinations to the mobile communication device might be too long. In this case, a dialog between the user and the server may be useful so that speech input from the user may be processed by the server, which then transmits the resulting data (e.g., a specific destination) to the mobile communication device for continuation of the dialog between the mobile communication device and the user. In this way, a system may have both a dialog between the user and the mobile communication device and—via the mobile communication device—a dialog between the user and the server.

Running a dialog script on the server may be initiated by the mobile communication device. Thus, there may be mainly a dialog between the mobile communication device and the user, with the server entering the dialog only if necessary, e.g., upon initiation by the mobile communication device.

Figure 2:
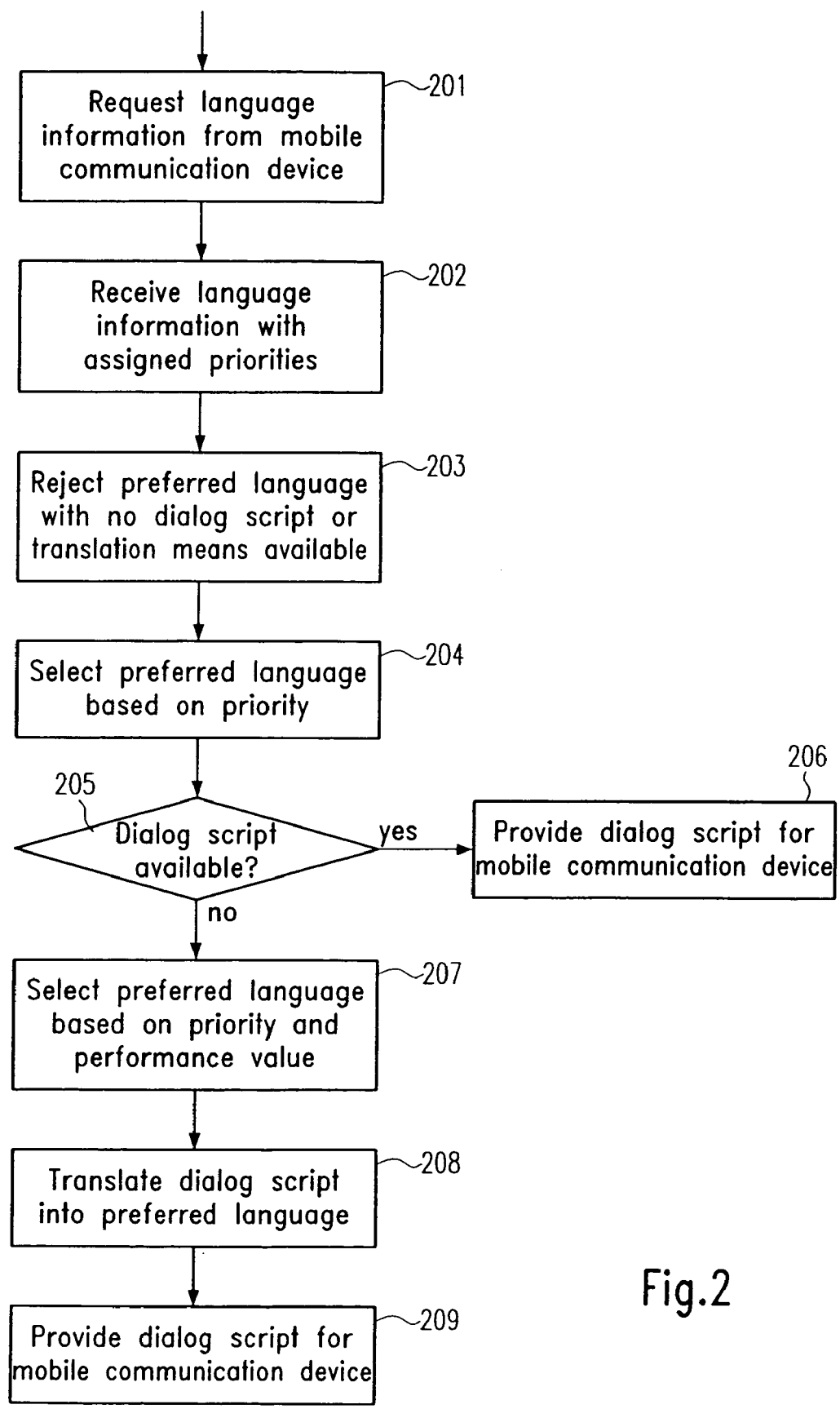
FIG. 2 is a flow diagram illustrating a method for providing information by a server.

A method for providing the information by a server is shown in FIG. 2. In this example, after a connection between the mobile communication device and the server is established, the server requests language information from the mobile communication device 201. Alternatively, the mobile communication device may automatically transmit the language information after establishing the connection without explicit requests from the server. The language information may be received by the server where each preferred language has an assigned priority 202. For example, the language information may include one or several preferred languages of the mobile communication device together with the corresponding priority. The preferred languages are the languages with which the mobile communication device itself or some of its modules or elements are configured. Alternatively or additionally, the mobile communication device may also have an explicit list of preferred languages previously stored by a user.

If the language information includes more than one preferred language, each preferred language may have an assigned priority. The priority may be explicitly assigned by a user. For example, if the mobile communication device has a stored list of preferred languages, this list may also include corresponding priorities.

Alternatively, the priority may depend on where the preferred language comes from, such as whether it is the language for operating the mobile communication device itself or the language of a speech recognition means. The speech recognition means may be implemented as a separate chip in the module, or may be implemented in software. In this case, a preferred language has a priority corresponding to the importance or priority of the module from which it stems. This priority of the devices or modules may be determined or stored in a memory. For example, the mobile communication device may be configured such that the priority of the language for operating the mobile communication device itself is highest whereas the priority of a speech recognition means of the mobile communication device is lower than this highest priority. The priorities may be given numbers in ascending order (1, 2, 3, . . . ) for example.

As described above, the server may receive the language information with the priorities already assigned to the preferred languages. However, it may be also possible that the server receives only a list of preferred languages (if more than one language is present in the mobile communication device) and, for example, the information regarding which device or module corresponds to a particular language. Then, the server may rank the preferred languages according to a predetermined criterion. For example, the ranking may be based on the type of the corresponding device or module.

Each language for which neither a dialog script nor a translation means is available may be rejected 203. In principle, translation means on the server and/or on the mobile communication device may be considered. If translation means of the mobile communication device are to be considered, however, corresponding information may be provided for the server by the mobile communication device. This may be achieved by transmitting a list of available translation means together with the language information from the mobile communication device to the server.

If the language information from the mobile communication device has one language, neither assigning priorities nor selecting one of the preferred languages is necessary. It is assumed that at least one preferred language is still available. If not, the user may be prompted via the mobile communication device whether he is familiar with other languages or whether he wishes to receive the information in a language that is available to the server. A preferred language based on the assigned priorities may then be selected 204. The language with the highest priority may be selected. Whether a dialog script is available for the selected preferred language may be determined 205. If a script is available, the server provides the corresponding dialog script for the mobile communication device 206.

In this example, it is assumed that the information is provided with the aid of a dialog between the user and the mobile communication device and/or the server. However, it may be that the information is presented without a dialog. In this case, step 205 may be replaced with determining whether the information itself is available in the selected preferred language.

If no dialog script for the selected preferred language is available, a preferred language may be selected based on the priorities and the performance values of the translation means 207. A performance value may be an indication for the quality of a translation means. A performance value may be obtained, for example, by translating a test sentence using different translation means and comparing the number of errors. The fewer number of errors produced, the better are the translation means and the performance value. The performance values may be specified in a variety of in different ways; for example, the available translation means may be assigned numbers indicating the number of translation errors or simply by ascending number starting from 1.

For selecting a preferred language based on the priorities and the performance values, these two parameters may be combined in some way to form a common criterion. For example, a priority and a performance value corresponding to a specific language may be multiplied by predetermined weights (for example, $\alpha$ and $1-\alpha$ with $0 \leq \alpha \leq 1$) and then summed. This results in new values giving a ranking of the preferred languages based on both the priority and the performance value. There are other ways to make this selection as known to those of skill in the art, including nonlinear combinations.

The dialog script may be translated into the selected preferred language using the corresponding translation means 208. In particular, the outputs to be presented to a user may be translated. The translated dialog script may be provided for the mobile communication device where it is run to perform a dialog in the preferred language between the mobile communication device and a user 209.

If a translation means is used, such as a translation tool implemented in software on a microprocessor or a DSP of the mobile communication device, there may be no translation of the dialog script. Instead, a dialog script for a language may be selected for which a translation means into a preferred language is available on the mobile communication device. This dialog script may be transmitted to the mobile communication device where it is run. The corresponding translation means of the mobile communication device may be activated. Each time an output is presented to the user, this output may be translated into the preferred language. An input of the user may be translated from the preferred language to the language of the dialog script.

In the above example of FIG. 2, a user may acquire the information from an automated information service. In some cases, however, a human operator may have to be involved. For example, a user may contact a call center of a travel agency. This call, first of all, may be received by a corresponding server automatically requesting language information as in step 201 described above. After having received the corresponding language information, the server may select a preferred language in a similar way as described above. However, in this case, the relevant question is whether a human operator speaking one of the preferred languages is available. Therefore, a preferred language may be selected based on the assigned priorities and/or on the fact of which operator is available. The operators may also have an assigned performance value indicating their language capabilities regarding foreign languages for example. After selection of a preferred language, the corresponding human operator may be automatically contacted by the server such that a dialog between the operator and the user may be started.

Figure 3:
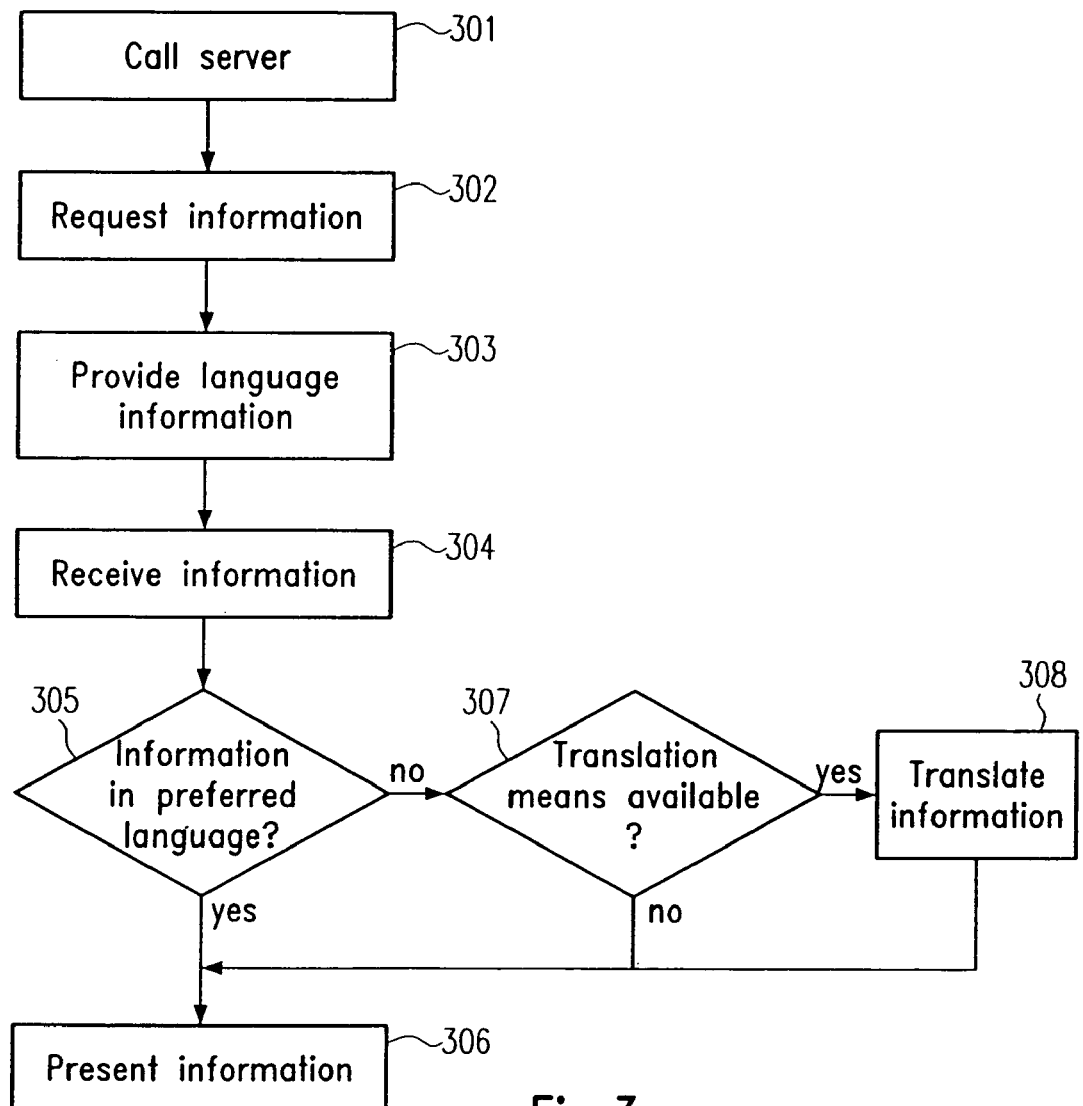
FIG. 3 is a flow diagram illustrating a method for receiving information via a mobile communication device.

FIG. 3 illustrates a flow diagram of a method for receiving information via the mobile communication device. The mobile communication device calls the server to establish a connection 301. This call may be done via a digital telephone network or any other suitable network. After a connection is established, the mobile communication device may information 302. In the present example, this request may include all necessary details to obtain the full information directly in response to the request. However, the mobile communication device may also transmit a request for a dialog script, which then is responsible for performing a dialog between the mobile communication device and the user to provide the information.

The mobile communication device may provide the server with language information 303. This language information may include information on at least one preferred language of the mobile communication device. In response, the mobile communication device may receive information from the server 304. Whether the information is in a preferred language may be determined 305. For example, in some cases, the server may not be able to perform multilingually, as described above, or has neither the information itself nor a translation means for a preferred language of the mobile communication device. In this case, the mobile communication device may receive the information in a language that is not preferred.

If the information is in a preferred language, the information may be presented to the user 306. If not, whether a translation means is available on the mobile communication device may be determined 307. If there is, the translation means may be activated and the information may be translated into the preferred language 308. After that, the information may be presented to the user.

Figure 4:
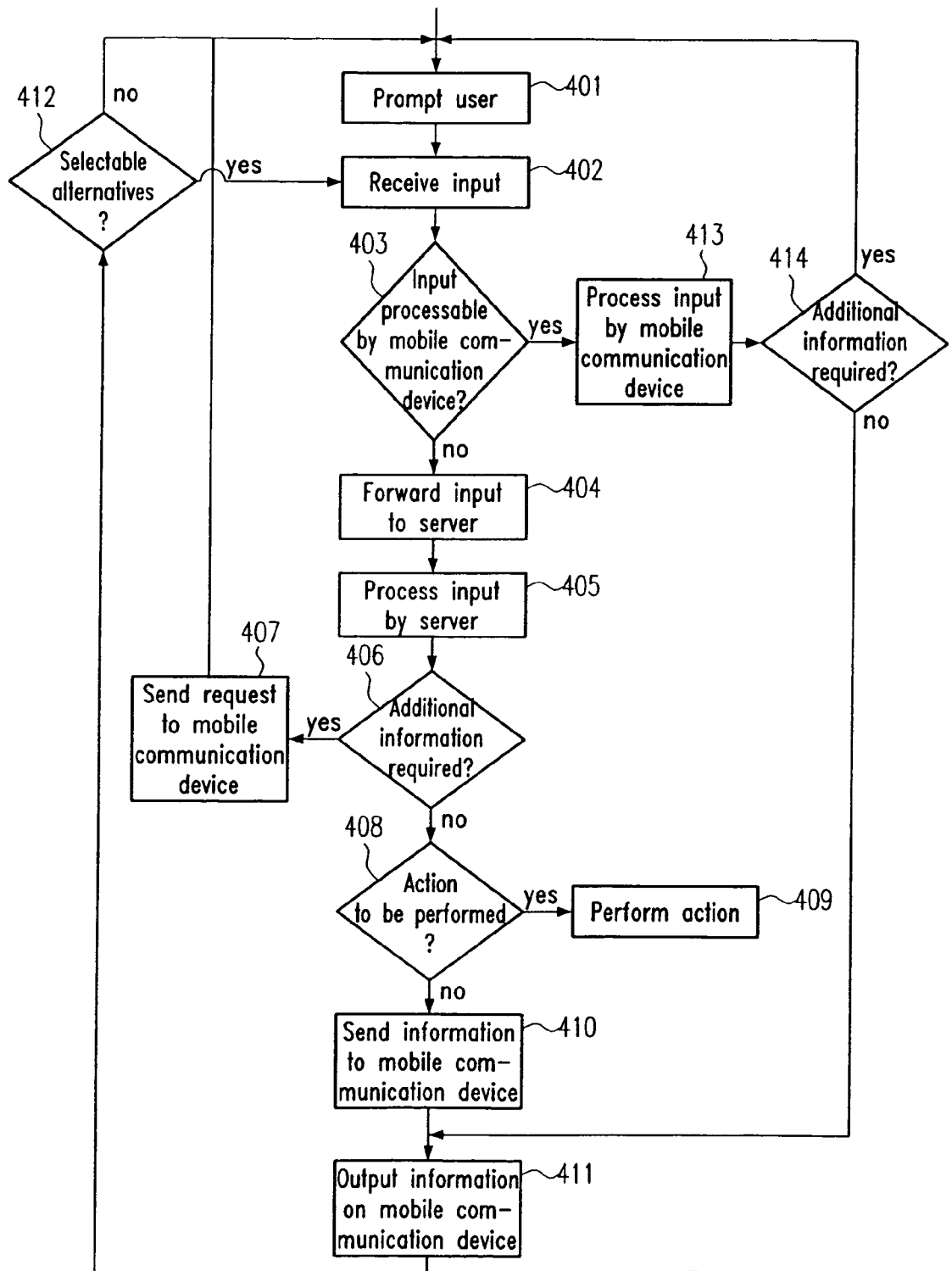
FIG. 4 is a flow diagram illustrating the running of a dialog script on a mobile communication device.

In more complex situations, it may be helpful or even necessary that a user is asked some questions to be able to provide the required information. In this case, the dialog may be performed between the mobile communication device and the user. An example for such a dialog is illustrated in FIG. 4. During a corresponding dialog, a user may be prompted one or several times 401. For example, after establishment of a data connection between the mobile communication device and a server of a travel agency or an airline, a typical dialog may start with: "Welcome to our automated flight information service. Please state the name of the departure city."

The prompt may be output in a number of ways. In particular, an acoustical output may be effected either by playing a previously stored speech signal or by synthesizing a corresponding speech signal. In addition or alternatively, an optical output on a display of the mobile communication device may be present. The acoustical and the optical output may but need not be identical. For example, in the case of the above-mentioned flight information, the term "Departure city?" may appear on the display at the beginning of the dialog. An input of a user may be received 402. Again, this input may happen in different ways. First of all, a user may input the required information acoustically, for example, by speaking the word "Munich." A haptic input may be used. For example, a user may enter the input via one or several keys that are part of the mobile communication device. If the mobile communication device includes a touch screen, the user may enter the input via this touch screen, for example, by selecting the city name out of a presented list of possible inputs. With a touch screen, a graphical input is also possible which means that the input is written by hand onto the screen using a suitable pen, for example.

Whether the input may be processed by the mobile communication device may be determined 403. Processing an input may be done in any number of way. In some cases, the input must be processed to be recognized at all. In the case of an acoustic input, for example, speech recognition may have to be performed. For this, standard methods of speech recognition, which are known or may become known, may be used. For example, a speaker dependent speech recognition may be present on the mobile communication device. This speech recognition may be adapted to the user. Alternatively and/or additionally, a speaker independent speech recognition may be performed on the server or on the mobile communication device. If an input is effected graphically via a touch screen, character or handwriting recognition may be performed to recognize this input.

However, the mobile communication device may be unable to perform speech recognition or to recognize a specific input utterance because no corresponding vocabulary is stored in the mobile communication device. For example, if a city name is to be recognized, the corresponding list of possible city names might be too large to be stored in or to be transmitted to the mobile communication device and is, thus, only present on the server. This may similarly apply to the case of a haptic or graphical input via a touch screen. If the input cannot be processed on the mobile communications device, it may be forwarded to the server 404. Then, the input may be processed by the server 405, for example, using an appropriate speech or character recognition. Forwarding of the input to the server may be particularly useful when processing the input requires a large amount of data.

After having processed the input, whether additional information (additional input) is required for continuation may be determined 406. If this is the case, a corresponding signal or request may be sent to the mobile communication device 407. This may result in another prompt (401) regarding the additional information. In this example, such a prompt may be "Please state the name of the destination city" (acoustical output) and "Destination city" (optical output on display). The user may enter a corresponding input, "Madrid", for example, and the dialog continues as described above.

If no further information is required, whether the input requires an action to be performed may be determined 408. An action may be the booking of a flight or of a hotel room. If yes, the corresponding action may be performed 409. In the example corresponding to the illustrated dialog, an alternative to performing an action is providing information. Thus, if no action is to be performed, the required information may be sent to a mobile communication device 410. The mobile communication device may output the information 411. Providing information, however, need not be an alternative to performing an action but may be carried out in addition or in parallel.

As described above, the output may be an acoustical and/or an optical output. In particular, the information may be output on a touch screen such that different alternatives are presented to the user who may choose one of these alternatives via the touch screen. For example, the user may be provided with a plurality of possible alternatives, in the present case, a set of possible flight connections from Munich to Madrid. The user may be enabled to select one of the flights. Therefore, the user may select one of the flights by touching the screen at the appropriate position. If number keys such as the digits on a mobile phone are available, the user may also hit one of the keys 1, 2 or 3. According to a further alternative, the user may speak the connection by saying the flight number or the time (e.g., "Flight 4260" or "The connection departing at 14:55, please").

If the output includes selectable alternatives 412, the dialog awaits a further input 402, i.e., the selection of an alternative. If no selectable alternatives are present, the dialog may return to step 401. If the mobile communication device can process the present input, the input may be processed by the mobile communication device itself 413. Whether or not additional information is required may then be determined 414.

With the methods of the system provided, the mobile communication device and/or the server may be provided with corresponding computer-executable instructions.

The above described examples are intended as illustrations. Different combinations of the described features are possible as well. For example, the capabilities and responsibilities of the mobile communication device and the server may be distributed differently.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for providing information by a server via a mobile communication device comprising:
   (a) receiving a call over a cellular network to establish a connection between the mobile communication device and the server;
   (b) receiving preferred language information automatically from the mobile communication device over the cellular network, where the preferred language information comprises at least two preferred languages, each of which includes an assigned priority,
   (c) requesting, by the server, the preferred language information from the mobile communication device when the preferred language information is not provided automatically from the mobile communication device,
   (d) receiving the preferred language information from language settings of the mobile communication device in response to the request by the server, where the language settings include a language for operation of the mobile communication device;
   (e) determining the at least two preferred languages from the preferred language information and ranking the at least two preferred languages according to the assigned priority,
   (f) determining, by the server, a preferred language of the mobile communication device based on the ranking of the at least two preferred languages, and
   (g) providing the information by the server in the preferred language for the mobile communication device.

2. The method according to claim 1, where the preferred language is selected from the at least two preferred languages based on the ranking.

3. The method according to claim 1, where the providing information comprises using translation means for more than one language, and where each translation means has an assigned performance value, and the preferred languages are ranked based on the performance values.

4. The method according to claim 1, where the providing information comprises providing a dialog script for the mobile communication device by the server for performing a dialog between the mobile communication device and a user, and running the dialog script on the mobile communication device.

5. The method according to claim 4, where the providing the dialog script comprises the server selecting a dialog script for the preferred language.

6. The method according to claim 1, where the providing information comprises activating one or more of: a translation means of the server or a translation means of the mobile communication device for the preferred language.

7. The method according to claim 6, where activating a translation means is performed if no dialog script for the preferred language can be selected.

8. The method according to claim 1, where the providing information comprises selecting a human operator for the preferred language based on a performance value associated with the human operator.

9. The method according to claim 1, where the providing information comprises running a dialog script on the server for performing a dialog between the server and a user.

10. The method according to claim 9, where the running a dialog script on the server is initiated by the mobile communication device through a dialog script request.

11. A method for receiving information by a mobile communication device from a server, comprising:
   receiving a call over a cellular network to establish a connection between the mobile communication device and the server;
   providing an automatic transmission of preferred language information from the mobile communication device to the server over the cellular network, where the preferred language information comprises at least two preferred languages;
   receiving a request for the preferred language information from the server when the preferred language information is not automatically transmitted from the mobile communication device;
   determining at least one preferred language based on the preferred language information from the mobile communication device, where the preferred language information includes a language for operation of the mobile communication device;
   selecting a dialog script that corresponds with the at least one preferred language, where the selected dialog script is translated into the at least one preferred language when the available dialog scripts do not correspond with the at least one preferred language; and
   initiating the selected dialog script in the at least one preferred language from the server with the mobile communication device.

12. The method according to claim 11, where the automatically transmitting is performed upon request of the server.

13. The method according to claim 11, further comprising transmitting the language settings of the mobile communication device.

14. The method according to claim 11, further comprising receiving a dialog script for performing a dialog between the mobile communication device and a user from the server, and running the dialog script on the mobile communication device.

15. The method according to claim 11, further comprising running a dialog script on the server for performing a dialog between the server and a user.

16. The method according to claim 11, further comprising activating a translation means of the mobile communication device for the preferred language.

17. A method according to claim 11, further comprising transmitting the language settings of a speech recognition module of the mobile communication device.

18. The method of claim 11, further comprising transmitting a list of translation means with the preferred language information from the mobile communication device to the server.

19. The method of claim 11, further comprising transmitting language settings of a character input recognition module of the mobile communication device.

20. A computer program product, comprising one or more computer readable media having computer-executable instructions for providing information by a server via a mobile communication device, where the instructions include:
   (a) instructions for making a call over a cellular network to establish a connection between the mobile communication device and the server;

(b) instructions for receiving preferred language information automatically from the mobile communication device over the cellular network, where the preferred language information comprises at least two preferred languages, (c) instructions for requesting, by the server, preferred language information from the mobile communication device when the preferred language information is not provided automatically from the mobile communication device, (d) instructions for receiving preferred language information from language settings of the mobile communication device and from a speech recognition module of the mobile communication device, (e) instructions for determining a preferred language from the preferred language information, where the preferred language information includes a first language from the language settings and a second language from the speech recognition module and ranking the first and second languages according to a predetermined criterion to select the preferred language, (f) instructions for determining, by the server, the preferred language of the mobile communication device based on the ranking of the first and second languages, and (g) instructions for providing the information by the server in the preferred language for the mobile communication device.

21. A method for providing information by a server via a mobile communication device, comprising:

(a) instructions for receiving a call over a cellular network to establish a connection between the mobile communication device and the server;

(b) receiving preferred language information automatically from the mobile communication device over the cellular network, where the preferred language information comprises at least two preferred languages, (c) requesting, by the server, preferred language information from the mobile communication device when the preferred language information is not received automatically from the mobile communication device, (d) receiving preferred language information from language settings of the mobile communication device, where the language settings include a language for operation of the mobile communication device, (e) determining the at least two preferred languages from the preferred language information and ranking the at least two preferred languages according to a predetermined criterion, (f) automatically determining, by the server, a preferred language of the mobile communication device based on the ranking of the at least two preferred languages, and (g) providing the information by the server in the preferred language for the mobile communication device, where the providing information comprises using a translation means for more than one language, and where the translation means for each of the more than one languages has an assigned performance value, and the preferred languages are ranked based on a weighted function of the performance values and the ranking of the at least two preferred languages.

* * * * *